US005893936A

United States Patent [19]

Dyson

[11] Patent Number: 5,893,936

[45] Date of Patent: Apr. 13, 1999

[54] SHROUD AND CYCLONIC CLEANING APPARATUS INCORPORATING SAME

[75] Inventor: James Dyson, Bathford, United Kingdom

[73] Assignee: Notetry Limited, Little Somerford, United Kingdom

[21] Appl. No.: 08/860,077

[22] PCT Filed: Dec. 27, 1995

[86] PCT No.: PCT/GB95/03041

§ 371 Date: Aug. 8, 1997

§ 102(e) Date: Aug. 8, 1997

[87] PCT Pub. No.: WO96/19937

PCT Pub. Date: Jul. 4, 1996

[30] Foreign Application Priority Data

Dec. 28, 1994 [GB] United Kingdom .................... 9426287

[51] Int. Cl.[6] ........................................ B01D 5/10

[52] U.S. Cl. ................................ 55/337; 15/353; 55/449; 55/345; 55/459.1; 55/DIG. 3

[58] Field of Search ............................ 55/345, 337, 391, 55/410, 459.1, 449, 473, DIG. 3; 15/353

[56] References Cited

U.S. PATENT DOCUMENTS

| | | | |
|---|---|---|---|
| 4,593,429 | 6/1986 | Dyson | 15/353 |
| 4,643,748 | 2/1987 | Dyson | 55/338 |
| 4,826,515 | 5/1989 | Dyson | 55/DIG. 3 |
| 4,853,008 | 8/1989 | Dyson | 55/345 |
| 4,853,011 | 8/1989 | Dyson | 55/345 |
| 5,062,870 | 11/1991 | Dyson . | |
| 5,078,761 | 1/1992 | Dyson | 55/345 |
| 5,090,976 | 2/1992 | Dyson | 55/345 |
| 5,145,499 | 9/1992 | Dyson | 55/345 |
| 5,160,356 | 11/1992 | Dyson | 55/DIG. 3 |

FOREIGN PATENT DOCUMENTS

| | | |
|---|---|---|
| 0489565 | 6/1992 | European Pat. Off. . |
| 0557096 | 8/1993 | European Pat. Off. . |
| 0636338 | 2/1995 | European Pat. Off. . |
| 2249272 | 5/1992 | United Kingdom . |

*Primary Examiner*—Duane S. Smith
*Attorney, Agent, or Firm*—Ian C. McLeod; Mary M. Moyne

[57] ABSTRACT

The invention provides a shroud (10; 40) for use in apparatus incorporating a cyclonic dust separation divice for separating dirt and dust from an airflow, the shroud (10; 40) having a perforated portion (14; 44) having a multiplicity of perforations (30; 46) for allowing the airflow to pass therethrough. According to the invention, the upstream edge of each perforation (30) meets the upstream surface (28) of the shroud (10) at a sharply defined angle. The invention improves the performance of the dust separation apparatus in conjunction with which the shroud (10; 40) is utilized.

35 Claims, 2 Drawing Sheets

SHROUD AND CYCLONIC CLEANING APPARATUS INCORPORATING SAME

BACKGROUND OF THE INVENTION

1. Field of the Invention

The invention relates to an improved shroud and to apparatus incorporating an improved shroud.

2. Description of the Related Art

A shroud is used in conjunction with cyclonic dust separation means to filter an airflow. In apparatus incorporating dual cyclonic separation means, ie. two separate cyclones arranged in series to remove, initially, larger pieces of dirt and fluff and, subsequently, finer dust particles, the shroud is positioned between the two cyclone arrangements and the airflow is passed through the shroud to reduce the possibility of larger pieces of dust and fluff entering the second, high efficiency cyclone.

It has been found that various features of the shroud have an effect on the overall performance of the separation means. It is therefore an object of the invention to provide a shroud which improves the overall performance of the cyclonic dust separation means in conjunction with which it is used.

SUMMARY OF THE INVENTION

The present invention provides a shroud. Advantageous and preferable features are set out in the detailed description. When used in conjunction with dual cyclonic separation means, these arrangements improve the percentage of dirt, dust and fluff remaining in the low efficiency cyclone which, in turn, improves the performance of the high efficiency cyclone and thus of the entire separation means.

Embodiments of the invention will now be described with reference to the accompanying drawings, wherein:

DESCRIPTION OF THE PREFERRED EMBODIMENTS

Figure 1:
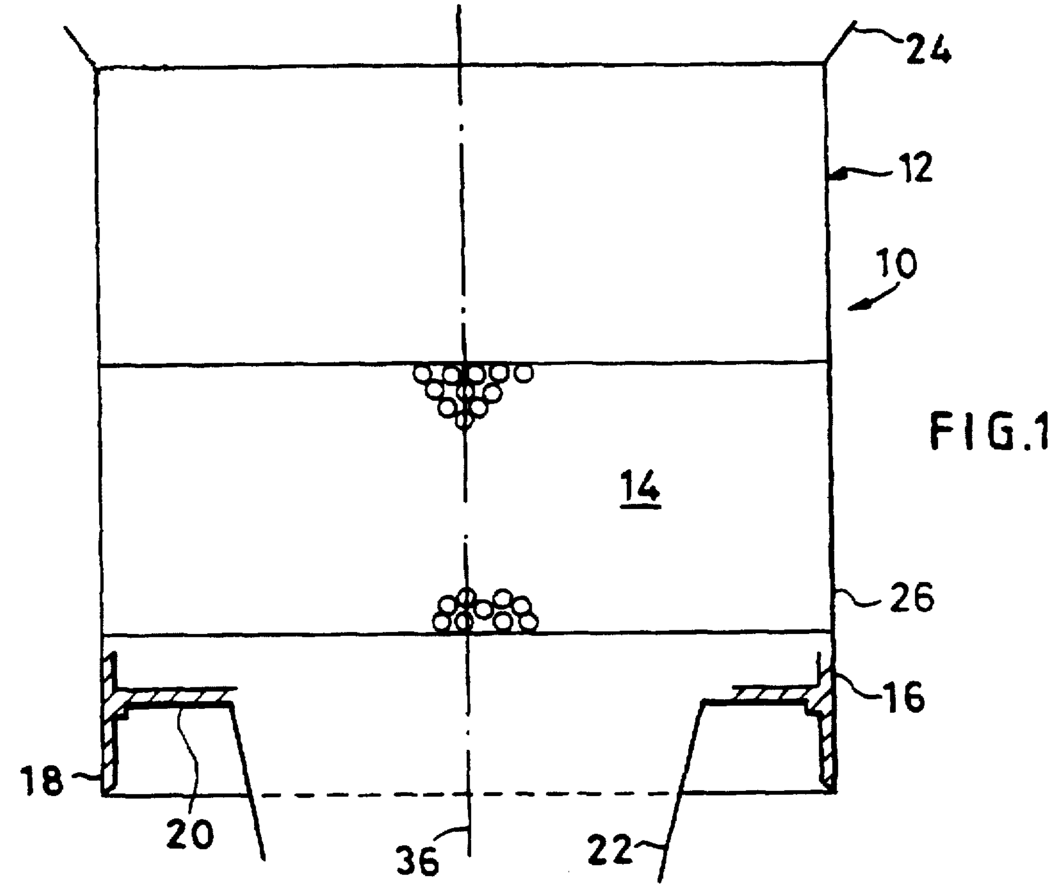
FIG. 1 is a side view, partially in section, of a shroud incorporating the present invention.

FIG. 1 shows a shroud 10 having a cylindrical portion 12 in which is located a perforated portion 14. The perforated portion 14 has a lower edge 16 from which depends a lip 18 which will be described in greater detail below. Extending radially inwardly from the lower edge 16 of the perforated portion 14 is an annular web 20 which communicates with or seals against an inner cyclone 22. The inner cyclone 22 forms no part of the present invention and will not be described in any further detail here. The web 20 effectively forms support means for and a seal against the cylindrical portion 12. Further support and sealing means 24 are located at the upper edge of the cylindrical portion 12 but which, again, do not form part of the present invention, except to support the cylindrical portion 12.

Figure 2A:
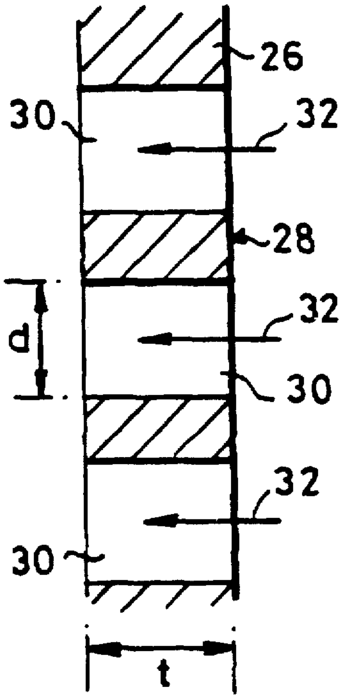
FIG. 2*a* is an enlarged sectional view of part of the wall of the perforated portion of the embodiment shown in FIG. 1.

FIG. 2*a* shows, in sectional view, a portion of the wall 26 forming the perforated portion 14. The wall 26 has an upstream surface 28 and a multiplicity of perforations 30 through which, in use, the airflow passes in the direction of arrows 32. In prior art shrouds, the perforations have been formed in such a manner that the upstream edge of each perforation incorporates a radius at its intersection with the upstream surface of the shroud. According to the present invention, the upstream edge of each perforation 30 meets the upstream surface 28 at a sharply defined angle. Such an angle can be produced by forming the perforations 30 by drilling or, if desired, by molding or any other suitable manufacturing process. The provision of a sharp angle at the intersection between the upstream edge of each perforation 30 and the upstream surface 28 of the shroud 10 decreases the amount of fine dust passing through the perforations 30 and therefore decreases the risk of the perforations 30 becoming blocked by dust and fluff particles.

The thickness of the material t forming the wall 26 is substantially 2 mm. The diameter d of each cylindrical perforation 30 is substantially 2.2 mm.

Figure 2B:
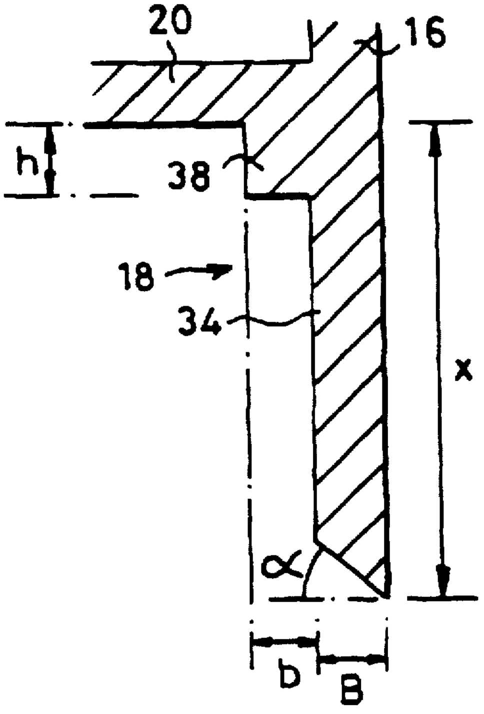
FIG. 2*b* is an enlarged detail of the embodiment shown in FIG. 1.

The embodiment shown in FIG. 1 includes a lip 18 depending from the lower edge 16 of the perforated portion 14. The lip 18, which is shown in more detail in FIG. 2*b*, essentially comprises a parallel sided portion 34 extending substantially parallel to the longitudinal axis 36 of the shroud 10. The distal end of the parallel-sided portion 34 is inclined at an angle $\alpha$ of substantially 45°. At the proximal end of the lip 18, a step 38 is formed, the breadth b of the step 38 being substantially the same as the breadth B of the parallel-sided portion 34. Both the breadth b and the breadth B are, in the embodiment shown, substantially 2 mm.

The height h of the step 38 corresponds substantially to the breadth b of the step 38 and, again, is approximately 2 mm in this embodiment.

The distance x to which the lip 18 extends below the lower edge 16 of the perforated portion 14 is approximately 15 mm.

It has been found that this shape of bottom lip 18 of the shroud 10 reduces the amount of blockage of the perforations 30 in the shroud 10 and the amount of fine dust passing through the perforations 30 when used in dual cyclonic vacuum cleaning apparatus with the shroud 10 being positioned in the airflow path between a low efficiency cyclone and a high efficiency cyclone. A relatively large proportion of dirt and dust is retained in the low efficiency cyclone and the step 38 also improves the seal between the lip 18 and the lower edge 16 of the perforated section 14.

Figure 3:
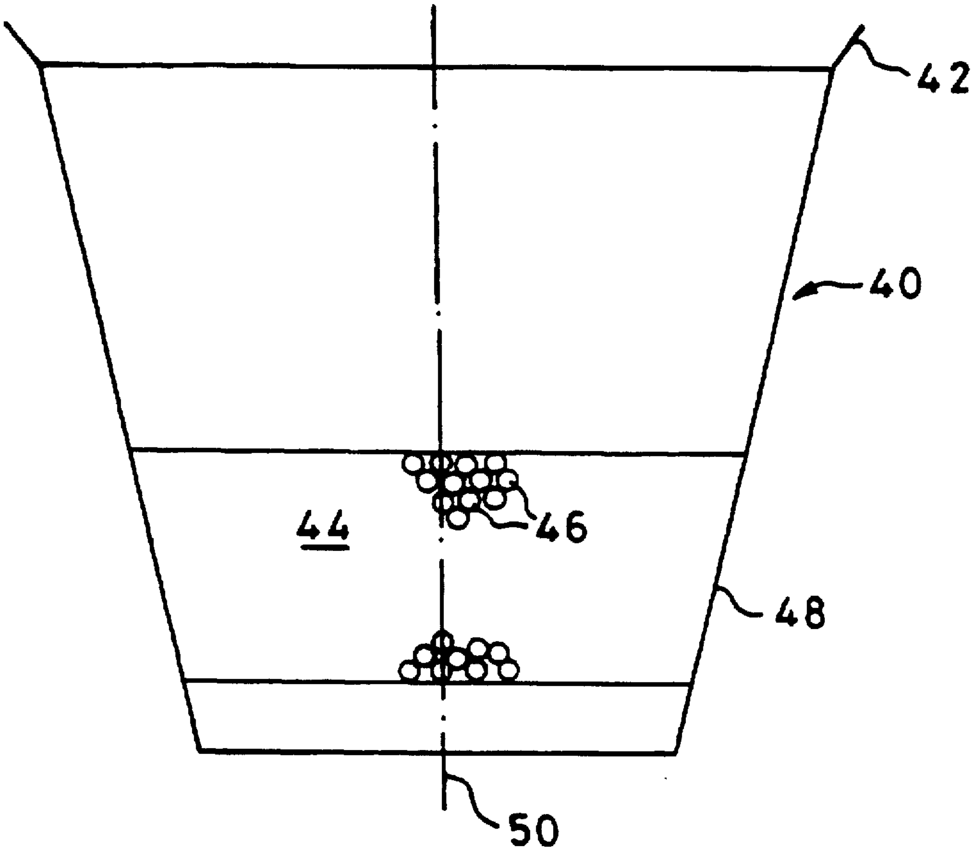
FIG. 3 is a side view of a second embodiment of the present invention.

FIG. 3 illustrates a second embodiment of the invention. In FIG. 3, a frusto-conical shroud 40 is illustrated having support means 42 located at the upper end thereof. A frusto-conical perforated portion 44 is located in the frusto-conical shroud 40. A multiplicity of perforations 46 are arranged in the perforated portion 44 and FIG. 3*a* is a sectional view through part of the side wall 48 of the perforated portion 44.

Figure 3A:
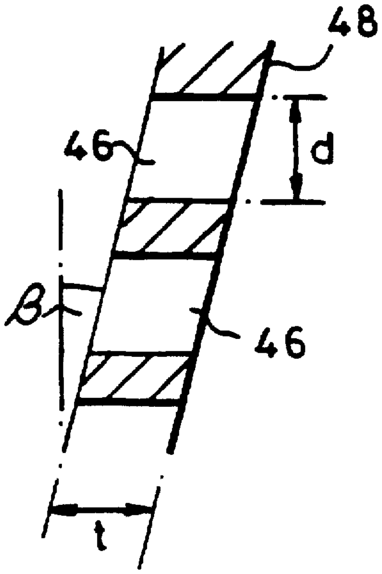
FIG. 3*a* is an enlarged section through part of the wall of the perforated section of the embodiment shown in FIG. 3.

As can be seen from FIG. 3*a*, the thickness t of the material forming the side wall 48 of the shroud 40 is substantially 2 mm. Also, the diameter d of each cylindrical perforation 46 is substantially 2.2 mm. The longitudinal axis of each perforation 46 is substantially perpendicular to the longitudinal axis 50 of the shroud 40 and the angle at which the interior wall of each perforation meets the external surface of the side wall 48 is sharply defined.

In the embodiment shown, the angle of inclination $\beta$ of the side wall 48 to the longitudinal axis 50 of the shroud 40 is substantially 12.5°. However, this angle could be varied according to the requirements of the cyclonic dust separating apparatus and particularly to the angle of inclination of the inclined wall of the high efficiency cyclone. The angle of inclination β is preferably substantially identical to the angle of inclination of the wall of the high efficiency cyclone so that the wall 48 of the shroud 40 can be located parallel to the inclined wall of the high efficiency cyclone whilst still providing for the passage of air between the perforations and the high efficiency cyclone.

It has been found that the provision of sharply defined perforations 46 having a diameter of 2.2 mm is advantageous in that the amount of fine dust passing through the shroud is reduced thus reducing the likelihood of the shroud becoming blocked by dust or fluff. The provision of a conical shroud 40 increases the volume of the area of the low efficienct cyclone in which dirt and dust is collected thus increasing the capacity of the cyclone.

It will be appreciated by a skilled reader that the invention is not limited to the embodiments illustrated above. Various modifications and alterations will be apparent to the skilled reader as falling within the scope of the invention.

I claim:

1. A shroud for use in apparatus incorporating cyclonic dust separating means for separating dirt and dust from an airflow, the shroud having an upstream surface and comprising a perforated portion having a multiplicity of perforations for allowing the airflow to pass therethrough perpendicular to a longitudinal axis of the shroud, wherein an upstream edge of each perforation meets the upstream surface of the shroud to form a sharp edge.

2. A shroud for use in apparatus incorporating cyclonic dust separating means for separating dirt and dust from an airflow, the shroud having an upstream surface and comprising a perforated portion having a multiplicity of perforations for allowing the airflow to pass therethrough, wherein an upstream edge of each perforation meets the upstream surface of the shroud to form a sharp edge and wherein an angle between the upstream surface and the upstream edge is substantially 90°.

3. A shroud as claimed in claim 1 or 2, wherein each perforation is cylindrical and has a diameter of substantially 2.2 mm.

4. A shroud as claimed in any one of claims 1 or 2 wherein a thickness of the perforated portion in a longitudinal direction of the perforations is substantially 2 mm.

5. A shroud as claimed in any one of claims 1 or 2 wherein the perforated portion is cylindrical.

6. A shroud as claimed in any one of claims 1 or 2 wherein the shroud further comprises a lip depending from a lower edge of the perforated portion.

7. A shroud as claimed in claim 6, wherein the lip comprises a parallel-sided portion having an inclined distal end.

8. A shroud as claimed in claim 7, wherein the distal end is inclined at an angle of substantially 45° to the parallel sides of the lip.

9. A shroud as claimed in claim 7 wherein the parallel sides of the lip extend substantially parallel to the longitudinal axis of the shroud.

10. A shroud as claimed in claim 7 wherein the lip extends between 10 mm and 20 mm below the lower edge of the perforated portion.

11. A shroud as claimed in claim 10, wherein the lip extends substantially 15 mm below the lower edge of the perforated portion.

12. A shroud as claimed in claim 7 wherein the lip is broader in cross-section at its proximal end than at its distal end.

13. A shroud as claimed in claim 12, wherein the lip comprises a step formed radially inwardly of the parallel-sided portion at the proximal end thereof.

14. A shroud as claimed in claim 13 wherein a breadth of the step is substantially equal to a breadth of the parallel-sided portion.

15. A shroud as claimed in claim 13 wherein a height of the step is substantially equal to a breadth thereof.

16. Apparatus as claimed in claim 1 wherein the cyclonic dust separation means comprise a low efficiency cyclone and a high efficiency cyclone positioned downstream of the low efficiency cyclone, the shroud being positioned between the two cyclones.

17. Apparatus as claimed in claim 16 wherein the apparatus consists of a vacuum cleaner.

18. A shroud as claimed in claim 9 wherein the lip extends between 10 mm and 20 mm below the lower edge of the perforated portion.

19. A shroud as claimed in claim 18 wherein the lip extends substantially 15 mm below the lower edge of the perforated portion.

20. A shroud as claimed in claim 9 wherein the lip is broader in cross-section at its proximal end than at its distal end.

21. A shroud as claimed in claim 10 wherein the lip is broader in cross-section at its proximal end than it its distal end.

22. A shroud as claimed in claim 20 wherein the lip comprises a step formed radially inwardly of the parallel-sided portion at the proximal end thereof.

23. A shroud as claimed in claim 21 wherein the lip comprises a step formed radially inwardly of the parallel-sided portion at the proximal end thereof.

24. A shroud as claimed in claim 22 wherein a breadth of the step is substantially equal to a breadth of the parallel-sided portion.

25. A shroud as claimed in claim 23 wherein a breadth of the step is substantially equal to a breadth of the parallel-sided portion.

26. A shroud as claimed in claim 14 wherein a height of the step is substantially equal to the breadth thereof.

27. A shroud as claimed in claim 22 wherein a height of the step is substantially equal to a breadth thereof.

28. A shroud as claimed in claim 23 wherein a height of the step is substantially equal to a breadth thereof.

29. A shroud as claimed in claim 24 wherein a height of the step is substantially equal to the breadth thereof.

30. A shroud as claimed in claim 25 wherein a height of the step is substantially equal to the breadth thereof.

31. A shroud as claimed in claim 8 wherein the parallel sides of the lip extend substantially parallel to the longitudinal axis of the shroud.

32. A shroud as claimed in claim 8 wherein the lip extends between 10 mm and 20 mm below the lower edge of the perforated portion.

33. A shroud as claimed in claim 8 wherein the lip is broader in cross-section at its proximal end than at its distal end.

34. A shroud as claimed in claim 32 wherein the lip is broader in cross-section at its proximal end than at its distal end.

35. A shroud as claimed in claim 18 wherein the lip is broader in cross-section at its proximal end than at its distal end.

* * * * *